US008819234B1

(12) United States Patent
Bauer et al.

(10) Patent No.: US 8,819,234 B1
(45) Date of Patent: Aug. 26, 2014

(54) SUPPLYING DATA STORAGE SERVICES

(75) Inventors: Andreas L. Bauer, Boxborough, MA (US); Stephen J. Todd, Shrewsbury, MA (US); Douglas A. Wood, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 935 days.

(21) Appl. No.: 11/904,880

(22) Filed: Sep. 28, 2007

(51) Int. Cl.
*G06F 15/16* (2006.01)

(52) U.S. Cl.
USPC ........... 709/226; 709/214; 709/215; 709/223; 707/609; 707/790

(58) Field of Classification Search
USPC ........... 709/226, 223, 214, 215; 707/609, 790
See application file for complete search history.

(56) References Cited

U.S. PATENT DOCUMENTS

| | | | |
|---|---|---|---|
| 6,567,937 B1* | 5/2003 | Flores et al. ............... 714/46 |
| 6,611,923 B1* | 8/2003 | Mutalik et al. ............. 714/4 |
| 6,735,691 B1* | 5/2004 | Capps et al. ............... 713/1 |
| 6,892,221 B2* | 5/2005 | Ricart et al. ............... 709/203 |
| 2002/0078046 A1* | 6/2002 | Uluakar et al. ............ 707/8 |
| 2005/0155033 A1* | 7/2005 | Luoffo et al. .............. 718/104 |
| 2007/0067373 A1* | 3/2007 | Higgins et al. ............. 707/206 |
| 2008/0082777 A1* | 4/2008 | Sakaguchi et al. ........ 711/170 |
| 2008/0162914 A1* | 7/2008 | Adrangi et al. ............ 713/2 |
| 2008/0270515 A1* | 10/2008 | Chen et al. ............... 709/202 |
| 2011/0023133 A1* | 1/2011 | Trevathan et al. ......... 726/30 |

* cited by examiner

*Primary Examiner* — Harunur Rashid
(74) *Attorney, Agent, or Firm* — Krishnendu Gupta; Jason A. Reyes; Deepika Bhayana

(57) ABSTRACT

A method is used in supplying data storage services. For a set of applications running on an electronic system, an application service is provided to each application in the set to support operation of that application. The application service is separate from operating system services and security protection services provided by the electronic system. A data storage service provider being separate from the electronic system is communicated with to use resources of the data storage service provider in providing the application service to each application in the set.

20 Claims, 9 Drawing Sheets

SUPPLYING DATA STORAGE SERVICES

BACKGROUND

In general, a server is a computer that services requests from one or more client computers linked by a network. For instance, a SQL server is a specialized computer that provides database access in response to SQL-coded client requests. Similarly, a web server is a specialized computer that provides web pages in response to web page requests.

The principal component to such a server is its specialized server application. Such an application typically includes a complex set of programs, configuration information, and data files, among other things. Additionally, such an application typically imposes a stringent set of minimal computer requirements to operate properly. Microsoft SQL Server® offered by Microsoft Corporation of Redmond, Wash. is an example of a SQL application. Apache HTTP Server offered by the Apache Software Foundation of Forest Hill, Md. is an example of a web server application. Microsoft Exchange Server® offered by Microsoft Corporation is an example of a messaging and collaborative software application.

The underlying hardware and operating system provide resources (e.g., compute time, memory, bandwidth, data storage, etc.) that enable the server application to achieve its various functions. For certain security protection services that the server application or operating system is otherwise incapable of otherwise obtaining (e.g., specialized anti-virus protection, firewall protection, and spam filtering), an independent application can be added to the server to provide those services.

SUMMARY

Unfortunately, there are drawbacks to supporting the operation of conventional servers. For example, the management of such servers (memory allocation, RAID level implementation, backup procedures, etc.) typically requires the involvement (time, an eye for detail, etc.) of trained and experienced technicians. Often, such a technician may be skilled and well-versed on managing operation of a particular server application, but lack important training to manage other server applications running on the same or adjacent computer systems.

Furthermore, even when such talent is available, certain application service tasks such as migration of the data to a new platform, or scaling up on an existing platform (e.g., adding more storage capacity or processing power) often becomes difficult as additional hardware comes into play and key information changes location. Moreover, such tasks are typically too much to expect the server's operating system to handle in an automated manner since the new hardware may be independent of the original server hardware. Similarly, such tasks are too complex to expect any additional security protection service software to handle since such software is specialized to handle just security protection. Additionally, such tasks are often too complex to expect the server application itself to handle since the server application typically runs at a high level without direct control over particular system configuration aspects such as throughput, memory allocation, RAID level implementation, or perhaps even backup procedures, among others.

In contrast to the above-described deficiencies to supporting the operation of conventional servers, an improved technique for supporting application operation is carried out separately from the conventional operating system services and security protection services traditionally found in a server. In particular, from a distinct application services platform, application support tasks such as application discovery, provisioning, and management are capable of being carried out. Such application awareness and control is preferably presented to a user as an integrated, unified user interface which can concurrently oversee the life cycle of multiple applications.

One embodiment is directed to a method for supporting application operation. The method includes discovering a set of applications running on an electronic system, and querying a user to identify which of the set of applications the user wishes to manage. The method further includes, for each application identified by the user, providing an application service to that application to support operation of that application, the application service being separate from operating system services and security protection services provided by the electronic system.

BRIEF DESCRIPTION OF THE DRAWINGS

The foregoing and other objects, features and advantages will be apparent from the following description of particular embodiments of the invention in conjunction with the accompanying drawings in which like numerals indicate like structural elements and features in the various figures. The drawings are not necessarily to scale, emphasis instead being placed upon illustrating the principles of various embodiments of the invention.

DETAILED DESCRIPTION

An improved technique for supporting application operation is carried out separately from the conventional operating system services and security protection services traditionally found in a traditional server. In particular, application support tasks such as application discovery, provisioning, and management are capable of being carried out from a distinct application services platform. Such application awareness and control is preferably presented to a user as an integrated, unified user interface which can concurrently oversee the life cycle of multiple applications.

Figure 1:
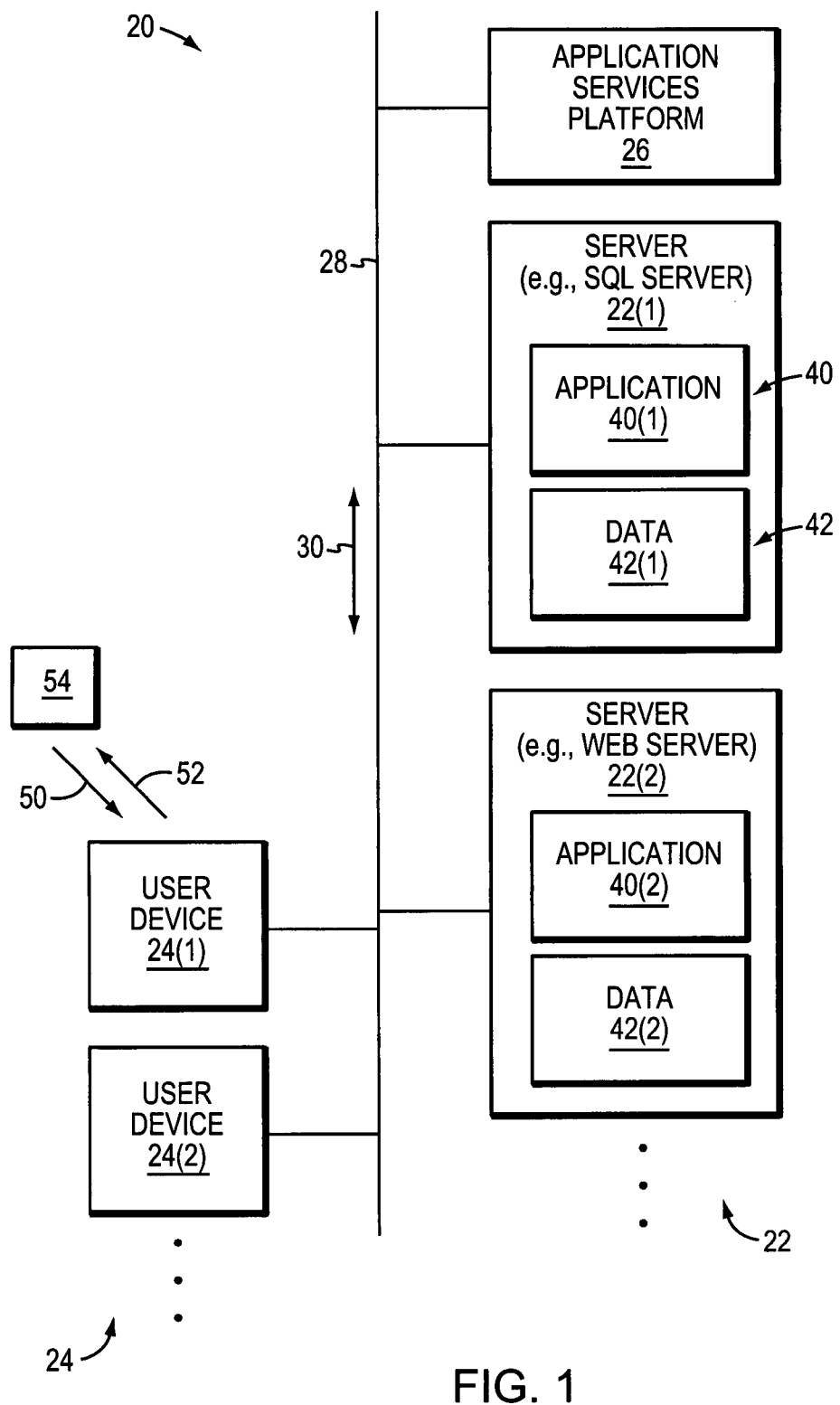
FIG. 1 is a block diagram of an electronic system having a distinct application services platform from which to carry out application support tasks.

FIG. 1 shows an electronic system 20 which utilizes a distinct application services platform from which to carry out application support tasks and enable application operation. The electronic system 20 includes a set of servers 22(1), 22(2), ... (collectively, servers 22), a set of user devices 24(1), 24(2), ... (collectively, user devices 24), an application services platform 26, and a communications fabric 28. The communications fabric 28 conveys signals 30 among the various computerized devices 22, 24, 26 of the system 20.

It should be understood that the communications fabric 28 is illustrated as having a backbone topology by way of example only. The communications fabric 28 may include a variety of media (e.g., copper wire, fiber optic cable, wireless medium, related data communications devices, combinations thereof, etc.) and other devices (e.g., network nodes, firewalls, routers, switches, bridges, gateways, etc.). Additionally, the communications fabric may have other topologies (e.g., hub and spoke, point-to-point, loops, irregular, combinations thereof, and so on).

Each server 22 includes a server application 40 (i.e., software running on one or more processors) and server data 42 (i.e., configuration information, transactional data, records, files, etc.). In particular, the server 22(1) includes a server application 40(1) and server data 42(1). Similarly, the server 22(2) includes a server application 40(2) and server data 42(2), and so on. It should be understood that each server 22 is further capable of having multiple server applications 40 and corresponding server data 42.

Each user device 24 is a client-style device such as a laptop, a computer workstation, a smart phone or appliance, and so on. The user devices 24 are arranged to obtain services from the servers 22. By way of example, the server 22(1) is a SQL server which provides access to a set of databases, and the server 22(2) is a web server which provides access to a set of websites.

During operation, the application services platform 26 is configured to receive input 50 from and provide output 52 to a user 54 (also see the signals 30 through the communications fabric 28). The input 50 is preferably in the form of a set of commands, data, and configuration information obtained through input equipment, e.g., a keyboard and a mouse. The output 52 is preferably in the form of text and graphical information presented to the user through a display (e.g., a web page on a web browser, a graphical user interface, etc.). To this end at least one of the user devices 24 (e.g., the user device 24(1)) is capable of operating as an input/output (I/O) device which enables the user 54 to control and operate the application services platform 26 in an interactive manner. Alternatively, the user can use a dedicated console (e.g., an I/O terminal directly connected to the application services platform 26) to provide the input 50 to and receive the output 52 from the application services platform 26.

In response to such user interaction, the application services platform 26 is arranged to carry out a variety of application support tasks such as application discovery, provisioning, and monitoring. Such operation, which will be discussed in further detail shortly, allows the underlying platforms of the servers 22 (e.g., the hardware and operating systems) to continue to reliably run their server software without being significantly taxed by having to directly perform the application support tasks as well. For example, suppose that the server 22(1) is nearing its throughput and storage limitations. Rather than burden the server 22(1) with having to run additional software to carryout the application support tasks which may be otherwise impossible due to the server's limitation, the applications support tasks can be freely carried out by the application services platform 26 in an unconstrained manner. Accordingly, the application services platform 26 reliably and robustly facilitates and enables application operation. Further details will now be provided with reference to FIG. 2.

Figure 2:
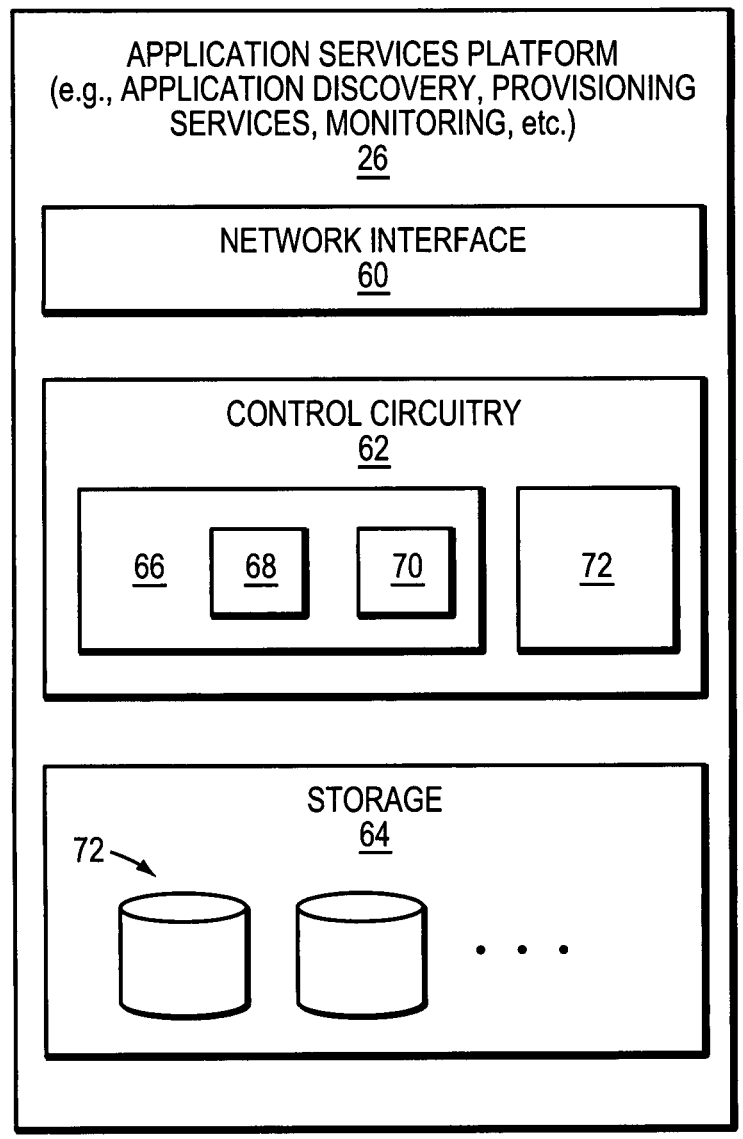
FIG. 2 is a block diagram of the application services platform of FIG. 1.

FIG. 2 shows particular details of the application services platform 26. As shown, the application services platform 26 includes a network interface 60, control circuitry 62 and storage 64. The network interface 60 is arranged to provide the application services platform 26 with connectivity to the communications fabric 28 of the electronic system 20 (e.g., access to a computer network). The control circuitry 62 includes (i) memory 66 which stores a specialized application 68 and other information 70 (e.g., application profile information) and (ii) a set of processors 72 which runs the application 68 in order to perform the application support tasks. The storage 64 includes a set of storage devices 74 (e.g., disk drives, flash memory drives, cache memory, etc.) to provide additional storage capacity which is available to the applications 40 running on the servers 22.

In some arrangements, the application services platform 26 is an enhanced storage array which conveniently provides high-throughput (e.g., reliable write caching), load balancing (multiple storage processors), fault tolerance (component redundancy), and data recovery (RAID with hot standby devices). For example, the enhanced storage array is adapted to provide application services to applications thus robustly and reliably enabling application operation. In some arrangements, the memory 66 and the storage 64 reside together physically but are allocated to the control circuitry 62 and the storage 64 in a predefined manner, e.g., using address partitions.

At this point, it should be understood that the application services platform 26 is equipped with both computer throughput power and storage capacity, and is capable of sharing this processing power and storage capacity with one or more of the servers 22 to improve operation of the electronic system 20 as a whole. Accordingly, the application services platform 26 enjoys the ability to provide application services and enable application operation beyond the limited conventional operating system services and security protection services offered by the individual servers 22 to their respective applications 40. Particular operational details of the application services platform 26 will now be provided with reference to FIG. 3.

Figure 3:
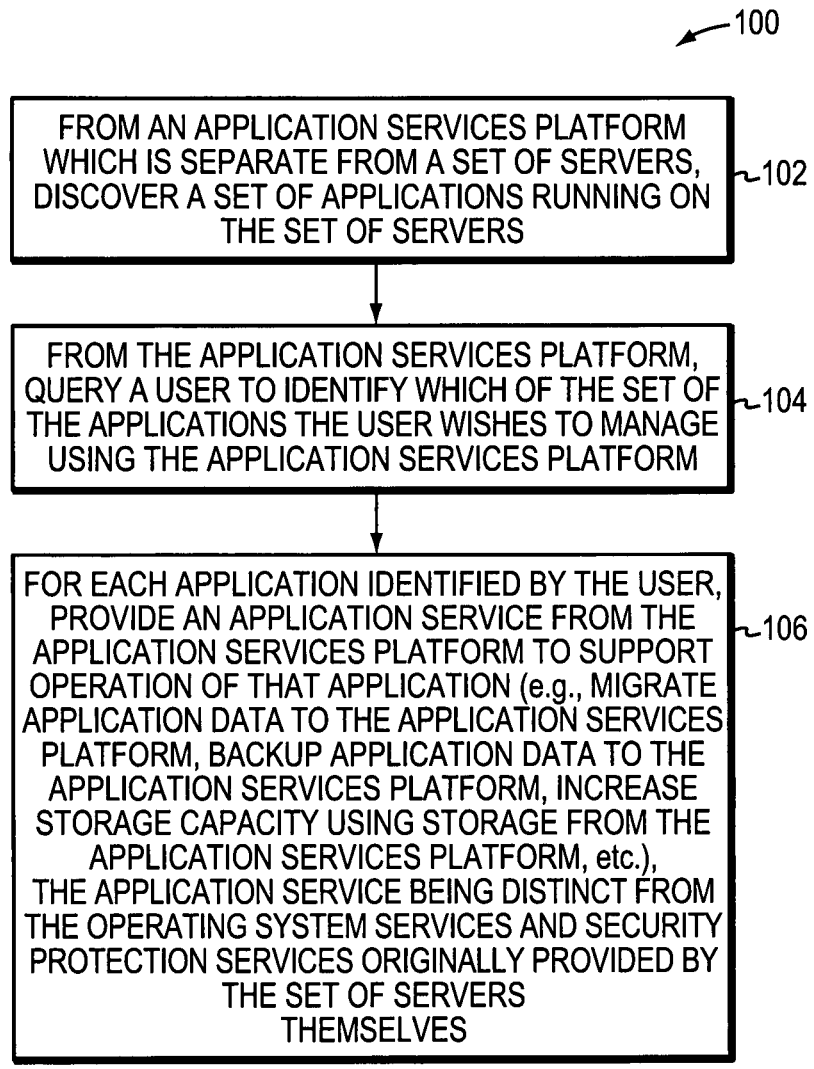
FIG. 3 is a flowchart illustrating a procedure carried out by the application services platform of FIG. 2.

FIG. 3 shows a procedure 100 which is performed by the control circuitry 62 of the application services platform 26. In step 102, the control circuitry 62 discovers a set of applications 40 running on the set of servers 22. In some arrangements, such discovery is automatically triggered upon powering up and connecting the application services platform 26 to the communications fabric 28. Such discovery is capable of being carried out transparently by monitoring communications (e.g., see the exchanged signals 30 in FIG. 1) on the communications fabric 28 without hindering routine operation of the servers 22 on the electronic system 20. A similar technique is described in U.S. application Ser. No. 11/906, 160 entitled "TECHNIQUES FOR AUTOMATED APPLICATION DISCOVERY", the teachings of which are hereby incorporated by reference in their entirety.

In step 104, the control circuitry 62 queries the user to identify which of the set of applications 40 the user wishes to manage. In this step, the user does not need to immediately manage all of the applications 40 using the application services platform 26. Rather, the user is capable of selecting applications 40 to manage and thus incrementally enhancing the operation of the electronic system 20 on an application-by-application basis. Along these lines, the user simply re-enters the procedure 100 to select a new application 40 that the user did not select during a previous iteration.

In step 106, for each application 40 identified by the user, the application services platform 26 provides an application service to that application 40 to support operation of that application 40. Such application services can be of a form that is beyond the operating system services and security protection services provided by the set of servers 22. For example, the application services platform 26 is capable of migrating either the application 40, the application data 42 or both to the application services platform 26. As another example, the application services platform 26 is capable of backing up either the application 40, the application data 42 or both to the application services platform 26. As yet another example, the application services platform 26 is capable of augmenting the storage capacity for the application data 42 using the storage 64 of the application services platform 26. Further details will now be provided with reference to FIGS. 4 and 5.

Figure 4:
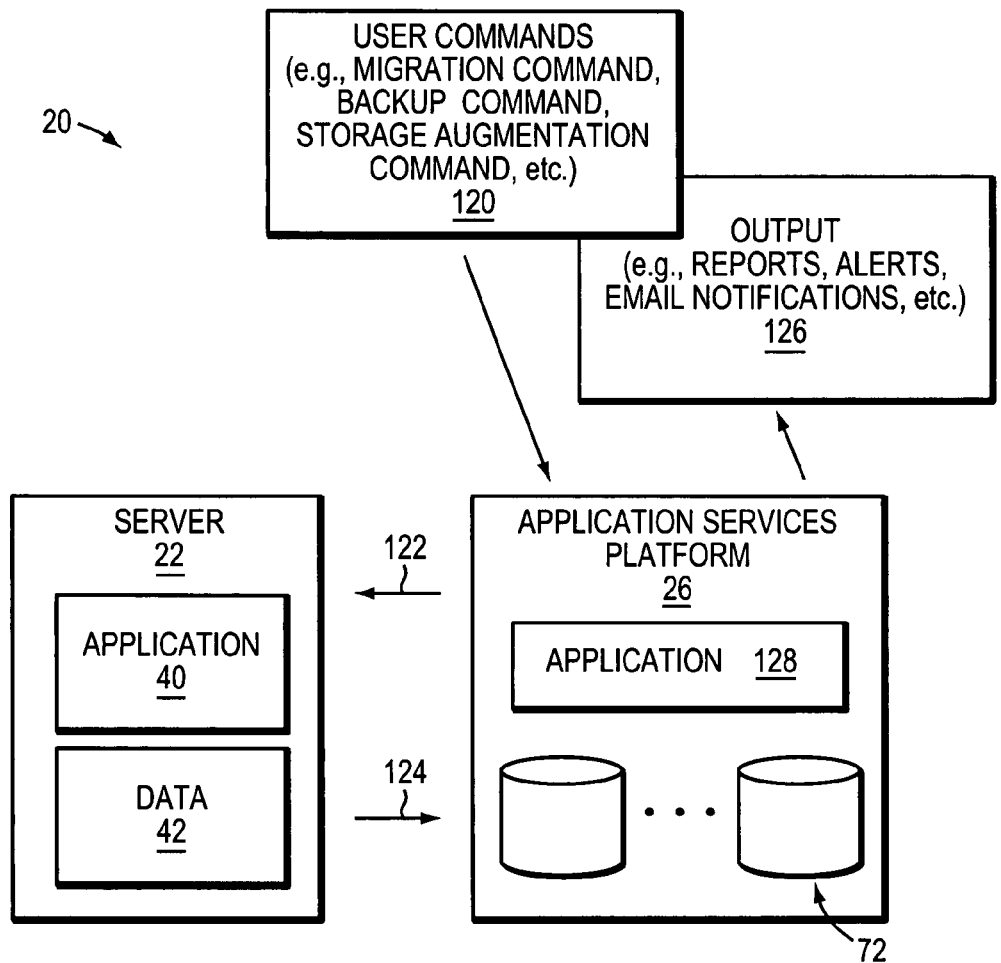
FIG. 4 is a block diagram illustrating certain application support services provided by the application services platform of FIG. 2.
Figure 5:
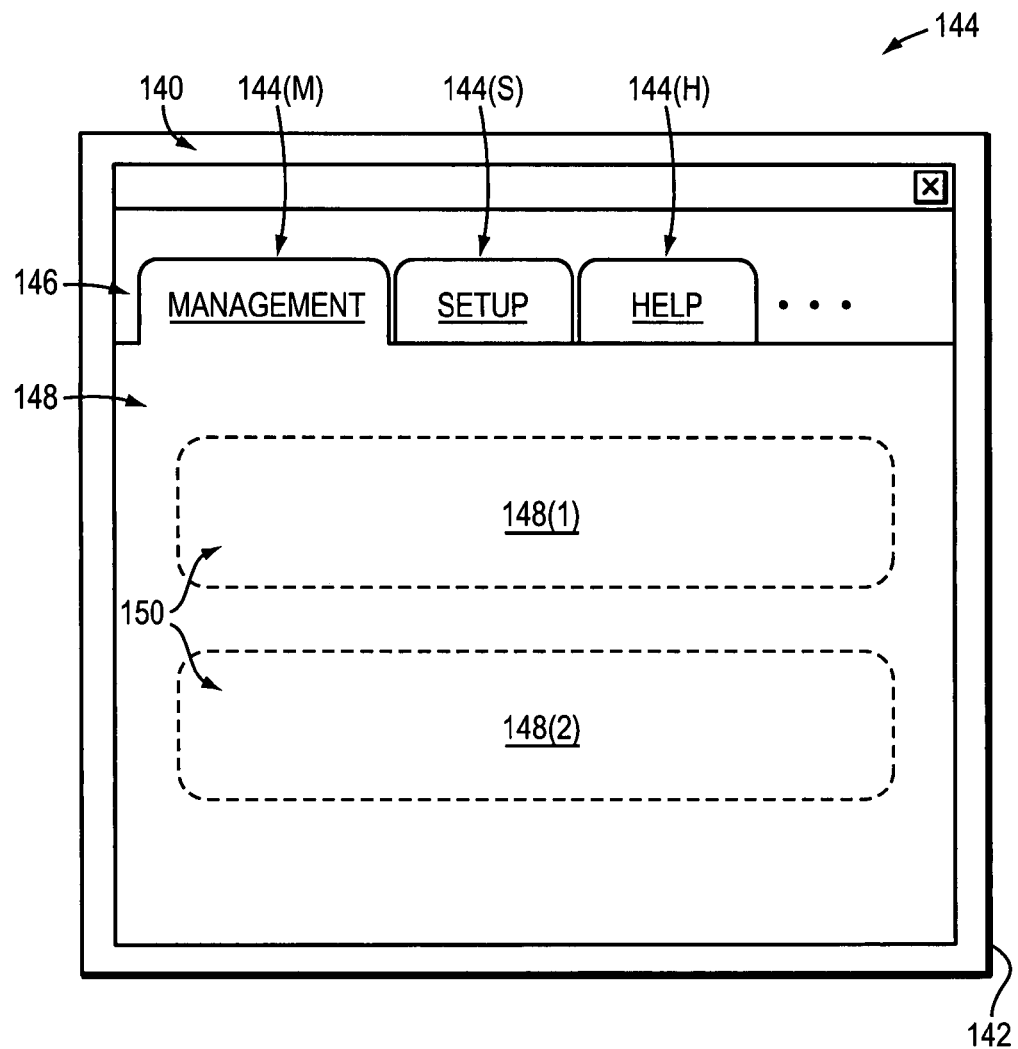
FIG. 5 is a block diagram of a web page layout which is suitable for use by the application services platform of FIG. 2.

FIGS. 4 and 5 illustrate particular aspects of user interaction with the application services platform 26. FIG. 4 illustrates how the application services platform 26 provides certain application support services to a server 22 in response to commands 120 from the user. FIG. 5 shows an example a screen layout 140 which the application services platform 26 provides to the user on a display 142, e.g., a screen of one of the user devices 24.

The user provides commands 120 (FIG. 4) to the application services platform 26 (also see step 104 in FIG. 3) by interacting with the display 142 (FIG. 5). Information on the display 142 facilitates the user's ability to effectively provide the commands 120. In particular, as illustrated in FIG. 5, the screen layout 140 provides windows 144 which give the user the ability to navigate among different features of the application services platform 26, e.g., using tabs 146 which the user can select by operating a mouse or cursor. Each window 144 provides the user with the ability to carry out certain operations. For example, a management window 144(M) enables the user to carry out certain application servicing and monitoring operations. As another example, a setup window 144(S) enables the user to carry out certain setup/configuration tasks. Additionally, a help window 144(H) provides the user with help, instructions, recommendations, etc. to aid the user. Other layouts, arrangements, tabs, etc. are suitable for use as well.

In the layout 140, each window 144 includes a set of panes 148 which enables the user to effectively interact with the application services platform 26. For example, as shown in FIG. 5, the management window 144(M) provides a discovery pane 148(1) listing applications 40 which the application services platform 26 has discovered running on the electronic system 20. The management window 144(M) further provides a task pane 148(2) which enables the user to select (e.g., in a simplified manner) particular types of application support tasks that the application services platform 26 is capable of providing to the discovered applications 40. Each pane 148 is capable of including various links or similar interfacing mechanisms 150 (shown generally by the arrow 150 in FIG. 5) that facilitate user navigation to other sources of user information.

Such a layout 140 results in a simple interface through which the user controls the application services platform 26. For example, for each discovered application 40, the user provides (i) a move command indicating whether the user wishes to move data 42 of that application 40 to new hardware of the application support platform 26, (ii) a backup command indicating whether the user wishes to backup the application data 42 on the new hardware, and (iii) a storage augmentation command indicating whether the user wishes to provide additional storage capacity for the application data 42 from the new hardware.

In response to such commands 120 or similar commands 120, the application services platform sends signals 122 to the server 22 on which the application 40 is running and receives signals 124 from the server 22, as well as provides output 126 back to the user. In this manner, the application services platform 26 coordinates its activities to carry out certain application service tasks thus enhancing the operation of the discovered application 40 and the electronic system 20 as a whole.

In some situations, the application services platform 26 is capable of communicating with the server 22 to migrate the discovered application 40 itself to the application services platform 26. To this end, the application services platform 26 installs and runs an application image 128 (FIG. 4) which is similar to the application 40 running on the server 22. As a result, the application services platform 26 is now able to contribute throughput and storage capacity, or eventually even take over entirely for the server 22 if the user decides that the application services platform 26 is better suited to run the application 40 in place of the server 22 going forward (e.g., the application services platform 26 may have faster hardware and more storage capacity than the original server 22).

At this point, it should be understood that the application services platform 26 is capable of performing a variety of specialized application management tasks. Below are a few examples of such tasks.

Report Generation

To direct the application services platform 26 to provide a report regarding a particular application 40 running on the electronic system 20, the user provides a report generation signal to the application services platform 26 (see the command 120 in FIG. 4). In response to the report generation signal, the application services platform 26 generates a report for the particular application 40 (see the output 126 in FIG. 4). The report provides configuration and performance information outlining how the particular application 40 is configured and performs when operating on the electronic system 20.

This report is capable of being viewed through the display 142, or exported for use in an analysis tool. Moreover, the report is capable of providing valuable information that may be needed by a server administrator during certain critical tasks such as migrating the application 40 itself from a server 22 to the application services platform 26 to take advantage of certain application services that the servers 22 may not be able to provide themselves (e.g., higher throughput, fault tolerance via a particular RAID level, data recovery, etc.).

Application Monitoring

To direct the application services platform 26 to monitor a particular application 40 running on the electronic system 20, the user provides a monitor signal to the application services platform 26 (see the command 120 in FIG. 4). In response, the application services platform 26 monitors operation and collects data (see the signals 122, 124 in FIG. 4).

Along these lines, the application services platform 26 can be configured to automatically send an email message to an email account of the user if it determines that a particular application 40 has failed (see the output 126 in FIG. 4). For example, if the application services platform 26 has not seen activity from a particular application 40 for a predetermined amount of time (e.g., a heartbeat) and/or the application services platform 26 has not received a response from the application 40 after a timeout period has elapsed, the application services platform 26 is capable of providing an alert email or notification to the user.

Within the alert email, the application services platform 26 preferably includes a web page link (similar to the links 150 in FIG. 5) which enables the user to navigate to appropriate web pages and immediately attend to the particular application 40 that has failed. In particular, the user clicks on the link which automatically launches a window 144 to the application services platform 26 to enable the user to access appropriate application servicing tasks.

For example, in response to a web page request generated by clicking on the link, the application services platform 26 provides an application management web page which details (i) fault information relating to the particular application 40 that has failed, and (ii) steps which have automatically been taken to preserve data of the particular application 40 (see the windows 144 in FIG. 5). Such a page is capable of informing the user that a particular disk drive has failed and that data of the particular application that resided on the particular disk drive has been recovered automatically to a hot spare disk drive (e.g., see the storage devices 72 in FIG. 4). Additionally or alternatively, such a page is capable of outputting a list of instructions arranged to instruct the user how to fix the particular application 40 that has failed (e.g., see the help window 144(H) in FIG. 5).

Additional Control

The application services platform 26 is capable of providing other application services as well. For example, the user is capable of providing a quality of service parameter to the application services platform 26 (see the command 120 in FIG. 4). The quality of service parameter defines a level of performance by a particular application 40. In response to the quality of service parameter, the application services platform 26 adjusts operation of the particular application 40 within the electronic system 20 to provide the level of performance by the particular application 40.

It should be understood that, when the application continues to run on a server 40, the application services platform 26 is able to improve certain aspects of quality of service such as response times for certain transactions if the application services platform 26 provides high speed caching for the application 40 (e.g., write back caching into semiconductor memory). Furthermore, when the application runs on the application services platform 26 itself opportunities for additional quality of service improvements exists such as prioritization/classification of requests, load balancing, and so on.

As another example, the application services platform 26 is capable of receiving a Redundant Array of Inexpensive Disks (RAID) parameter from the user for a particular application 40 (see the command 120 in FIG. 5). The RAID parameter defines a particular RAID level for storing data of the particular application 40 (e.g., RAID 0, RAID 5 and so on). In response to the RAID parameter the application services platform 26 stores the data of the particular application 40 in compliance with the RAID level parameter.

Figure 6:
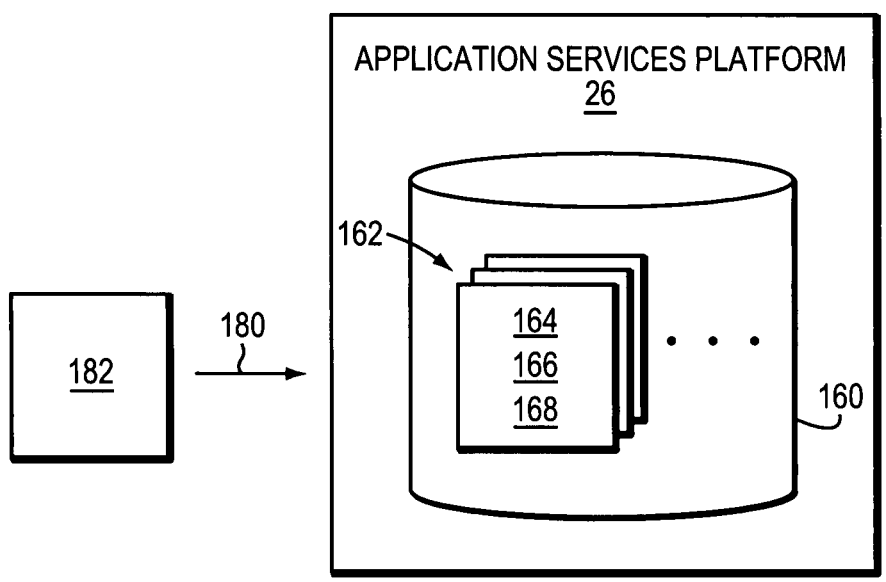
FIG. 6 is a block diagram of a supported-applications database of the application services platform of FIG. 2.

Further details will now be provided with reference to FIG. 6.

FIG. 6 shows a supported-applications database 160 which is maintained by the control circuitry 62 of the application services platform 26 (also see the other information 70 in FIG. 2). The supported-applications database 160 includes individual entries 162 corresponding to the applications 40 which the application services platform 26 is able to support. In particular, each entry 162 of the database 160 includes certain application specific information that enables the application services platform 26 to discover, provision and manage a particular application 40. Such information includes application pre-loaded application information 164, application information 166 that the application services platform 26 has accumulated over time by monitoring the communications fabric 28, and user-entered information 168 that has been added by the user.

In connection with the pre-loaded application information 164, such information 164 may include profile information which enables the application services platform 26 to properly communicate with the application 40 (e.g., validation, authentication, licensing, and security handshaking), specialized routines which enable the application services platform 26 to directly provision and manage certain operations of the application 40 (e.g., migration, backups, storage augmentation, application monitoring, fault handing, etc.), and management and support tools (e.g., recommended hardware requirements, recommended runtime provisions, tools for performance analysis, etc.).

It should be understood that the application services platform 26 is capable of receiving an external update request signal 180, and automatically updating the supported-applications database 160 with application information 182 (e.g., a new set of recommended provisions) in response to the external update request signal 180. Such a signal 180 may be automatically received in the form of periodic online updates, or obtained upon request by the user, or by other means (e.g., loading a CD-ROM, downloading from the network, etc.). Along these lines, application vendors may even offer the pre-loaded application information 164, 180 via an established value added reseller (VAR) agreement/relationship with the manufacturer/supplier of the application services platform 26. Such information 164, 180 is capable of being entered into the database 160 at the time of initial integration, at a subsequent time or both.

In connection with the run-time accumulated application information 166, such information 166 may include specific configuration details that the application services platform 26 has detected over time. Such information 166 may include specific configuration information (e.g., device network addresses, usernames, particular protocols in use, etc.), performance statistics (e.g., measured throughput/traffic, response times, frequencies of use, etc.), and recommendations generated by the application services platform 26 to improve performance and efficiency.

In connection with the user-entered application information 168, such information 168 may include commands and data that the user has entered during operation of the application services platform 26. Such information 166 may include the current configuration for the application 40 (e.g., where the application 40 resides, how the application 40 is configured to run, where the application data 42 resides, authorized users, passwords, allocated storage capacities, etc.), commands directing how the application services platform 26 should operate under certain situations (e.g., to guarantee a particular quality of service, to implement a certain RAID level, to carry out backups, to detect/correct certain types of faults, etc.).

In all, the various entries 162 containing the information 164, 166, 168 within the supported-applications database 160 are accessible by the user via the earlier-described user interaction (also see FIGS. 4 and 5). For example, the user is capable of obtaining, from the database 160, a set of recommended provisions or following a set of fault recovery instructions for a particular application 40 by accessing the database information through one of the user devices 24. Such user management of the applications 40 does not penalize the servers 22 since management occurs from the application services platform 26 without taxing the servers 22. Further details will now be provided with reference to FIG. 7.

Figure 7:
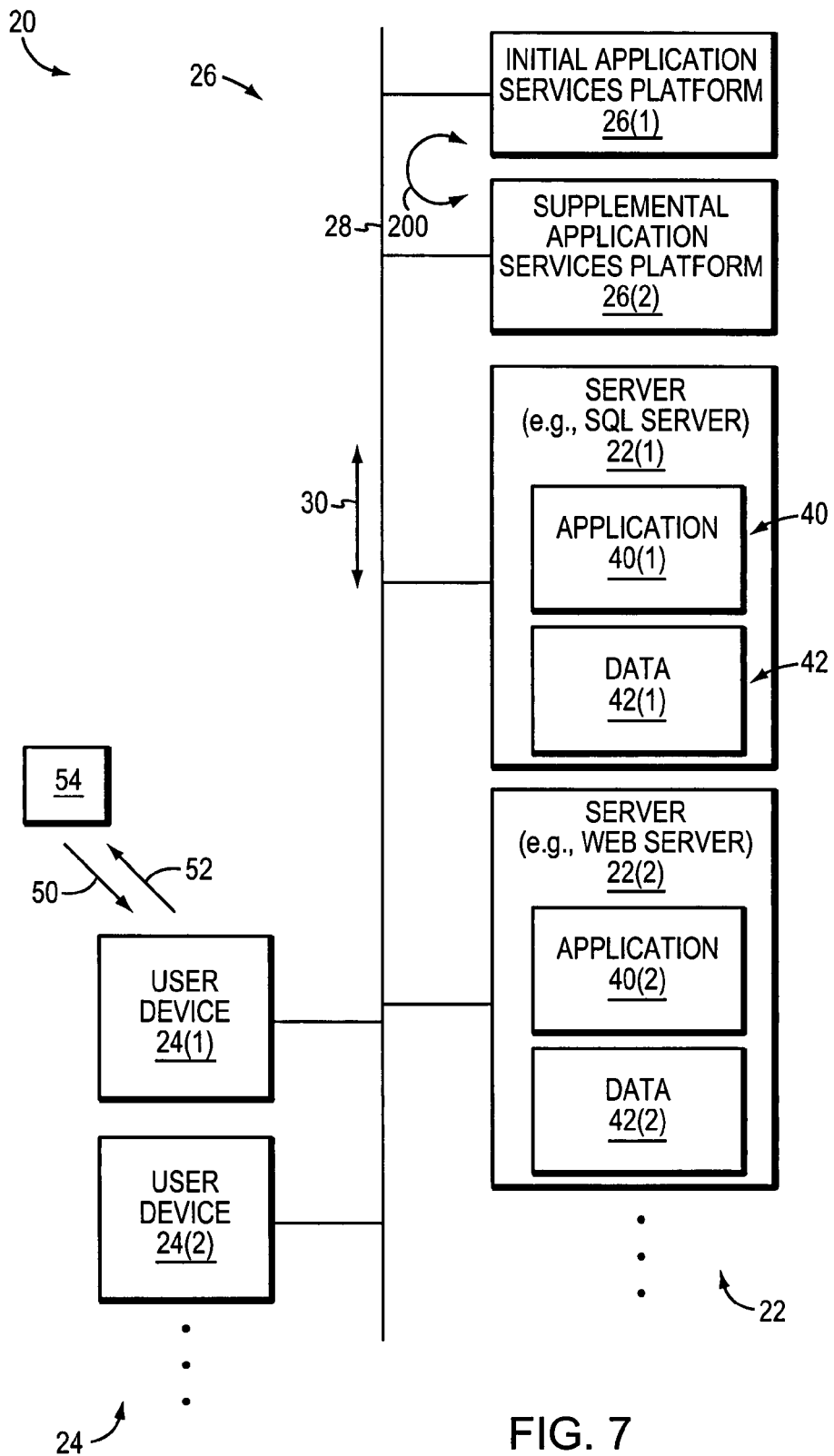
FIG. 7 is a block diagram of the electronic system of FIG. 1 with multiple application services platforms.

FIG. 7 shows the electronic system 20 with multiple application services platforms 26. Here, after the electronic system 20 has operated for a period of time with an initial application services platform 26(1), the user adds a second application services platform 26(2). Perhaps the initial application services platform 26(1) has increased the number of managed applications 40 over time and the additional hardware 26(2) has been added in a supplemental manner to maintain robust and reliable integrated, unified control over the many applications 40.

In some arrangements, the application services platforms 26 are arranged to carry out an auto-discovery procedure by exchanging signals 200. In particular, the second application services platform 26(2) transmits a new hardware signal onto the communications fabric 28. The new hardware signal indicates that additional new hardware has been added to the electronic system 20. The initial application services platform 26(1) receives the new hardware signal and responds by automatically re-running at least a portion of the procedure 100 (also see FIG. 3). That is, the application services platform 26(1) which may now be the primary or master of multiple application services platforms 26, re-lists the set of applications 40 that it knows about on the electronic system 20, and queries the user for new instructions (e.g., new user commands 120).

Accordingly, the user is able to direct the application services platforms 26 to carryout various application service tasks such as migration, backup and storage capacity augmentation but with the additional hardware in mind. With multiple application services platforms 26 enabling application operation, additional flexibility may now be available such as certain types of mirroring, load balancing and fault handling. Further details will now be provided with reference to FIG. 8.

Figure 8:
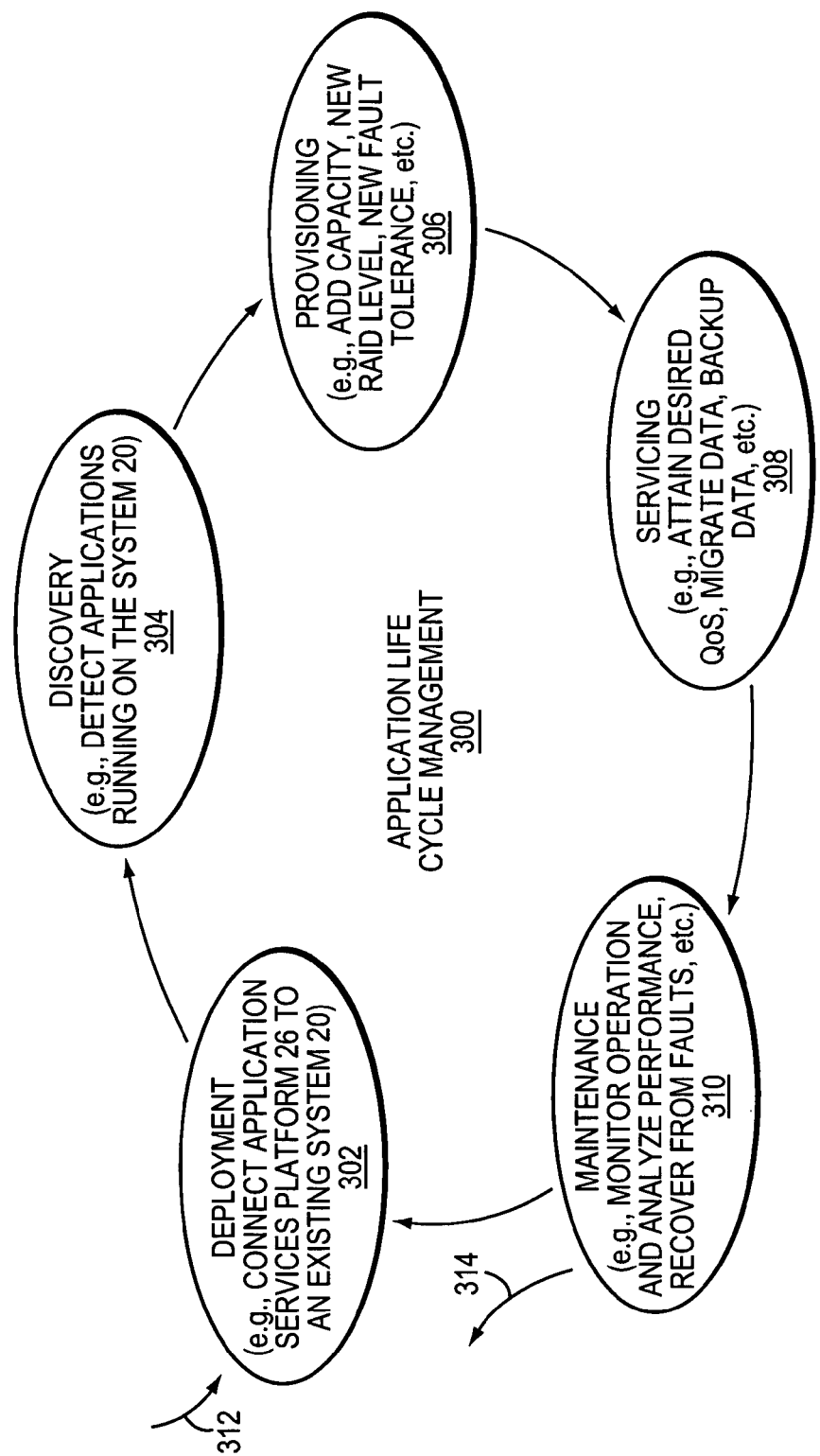
FIG. 8 is a general diagram illustrating the abilities of the application services platform of FIG. 2 to manage the life cycle of applications over time.

FIG. 8 provides a pictorial view 300 of the application awareness and management capabilities offered by the presence of one or more application services platforms 26 in the electronic system 20. Based on the pictorial view, it should be clear that the application services platform(s) 26 robustly and reliably support and manage the life cycle of the various applications 40 over time.

As shown in FIG. 8, the various features include deployment 302, discovery 304, provisioning 306, servicing 308, and maintenance 310 all of which are made available by the application services platform 26. Deployment 302 involves initially connecting each application services platform 26 to the electronic system 20 (also see FIG. 1). Discovery 304 involves detecting the applications 40 that are currently running on the servers 22 of the electronic system 20 and informing the user (also see step 102 of FIG. 3). Provisioning 306 involves providing certain application services to the electronic system 20 to improve performance, e.g., adding storage capacity, including new functionality such as particular RAID level implementation, disaster recovery, and so on (also see FIG. 4). Servicing 308 involves providing other application services to the electronic system 20 such as (i) additional processing power to impart a particular quality of service (QoS), (ii) migration of the application 40 and/or data 42, (iii) backing up of the application 40 and/or data 42, and (iv) adding support for new applications 40, among other things (also see FIGS. 4 and 6). Maintenance 310 involves ongoing operation of the application services platform 26 such as monitoring and analyzing application performance, detection and notification of faults, application and data recovery, etc. (also see FIG. 7).

It should be understood that deployment 302 can take place when the user initially adds a first application services platform 26 to an electronic system 20 (see the arrow 312). The user may have began a business operation with entry-level equipment and now faces the need to upgrade.

However, deployment 302 can also follow maintenance 310 such as when adding another application services platform 26 for flexibility and enhanced operation (e.g., see FIG. 7). Here, the user may have operated with the first application services platform 26 for a period of time but now wishes to further scale the electronic system 20 due to greater demands.

It should be further understood that maintenance 310 can also be followed by other operations 314 such as un-deployment which is handled by the application services platform 26. For example, the user is capable of sending the application services platform 26 an un-deploy command 120 for a particular application 40 (also see FIG. 4). In response to such a command 120, the application services platform 26 scrubs data for the particular application 40 and/or cleanly de-sinstalls the application 40 from the electronic system 20.

As described above, an improved technique for supporting application operation is carried out distinctly from the conventional operating system services and security protection services traditionally found in a server. In particular, from a separate application services platform 26, application support tasks such as application discovery, provisioning, and management are capable of being carried out. Such application awareness and control is preferably presented to a user 54 as an integrated, unified user interface 140 which can contemporaneously oversee the life cycle of multiple applications 40.

Figure 9:
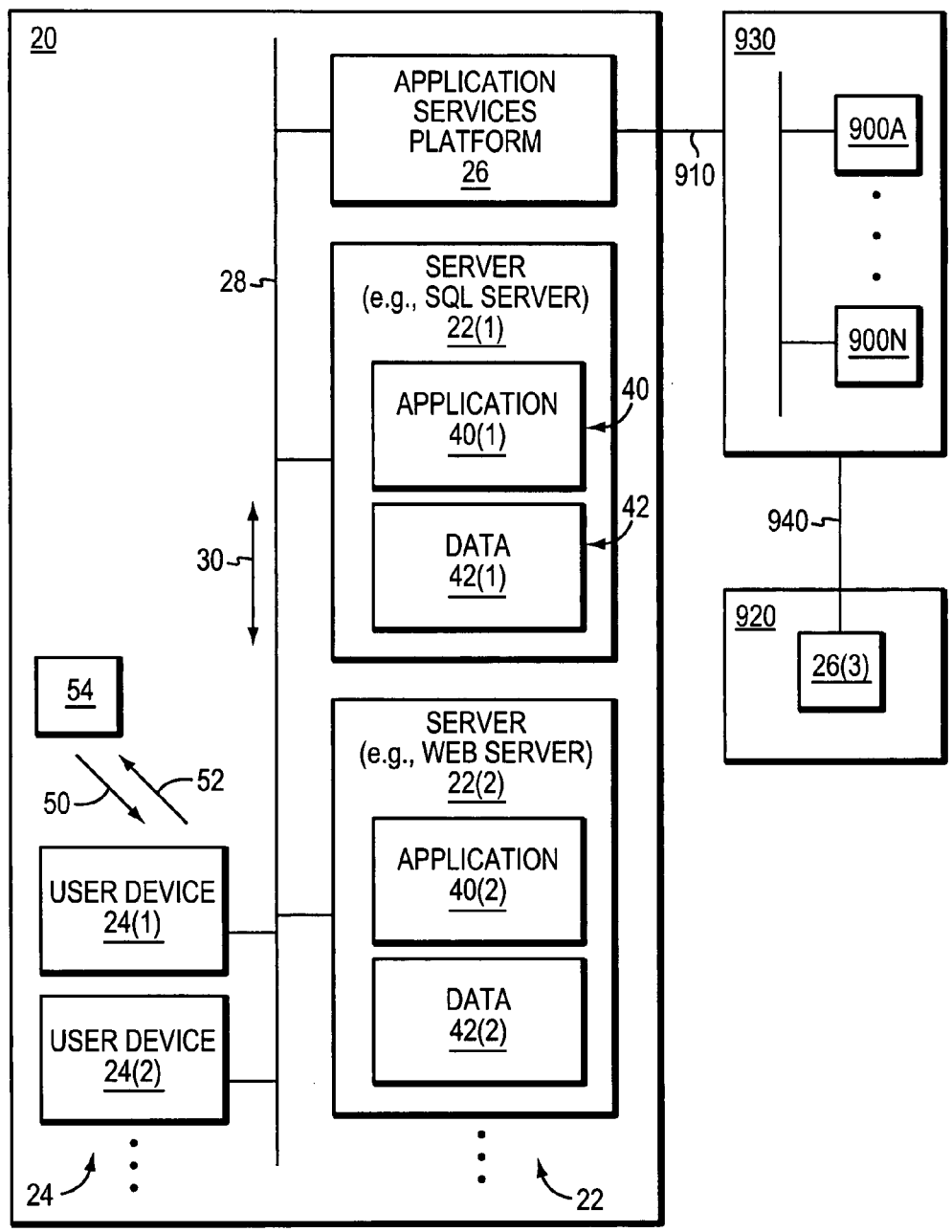
FIG. 9 is a block diagram of an application of the electronic system of FIG. 1.

In another aspect, with respect to FIG. 9, platform 26 may serve as an end point for services provided by an applications services provider 930. In such a case, applications of system 20 use storage of platform 26 and have direct protection and other features directly through platform 26 as described above, but platform 26 is also plugged into the infrastructure of provider 930. Through a link 910 provider 930 may provide industry standard Internet connectivity, but specifically provides services for the applications of system 20, e.g., backup to remote sites, replication, data migration, and content distribution to other sites, preferably all transparent to the end user and easy to use. By this aspect, services offered to the end user enjoy very high degrees of reliability and availability as platform 26 can be replicated, and is itself redundant. In addition as described further below, the services can migrate data off premises for distribution and further protection. In at least some implementations, user services are front-ended for consumers or a small business by a client portal, which runs in the users domain but interfaces to platform 26. In addition, in such implementations, a conduit exists between the user's portal, through platform 26 to the domain of provider 930 to help with the targeted delivery of context sensitive services and information.

Thus, platform 26 can support a comprehensive and/or integrated approach to such services, and optionally a pay-per-use model for one or more of such services. Conventionally, by contrast, backups for example have been self managed or enabled by add-on software.

In at least some implementations, in system 20 platform 26 hosts all of the services offered by provider 930 and thereby provides services to servers 22 and devices 24. For example, platform 26 helps provide a solution to a situation in which replication and/or disaster recovery features are needed or desired for a small office setting, but the small office has no suitable site which can participate as a data repository for such features, and the small office may have an Internet or network connection (e.g., link 910) (e.g., via DSL or cable modem) that, unaided, is too slow to support such features. Thus, platform 26 provides a way for the small office to have the benefit of sophisticated features effectively unavailable to the small office conventionally.

Provider 930 may be, include, or be included in an existing Internet connectivity provider, so that such connectivity provider can protect and otherwise manage the application data in system 20 beyond, for example, virus checking.

System 20 may have a substantial amount of application data to manage, and platform 26 can operate as a single point supplying services for such management. For example, provider 930 may have multiple high performance storage systems 900A-900N by which, together with platform 26, provider 930 can supply basic and sophisticated storage services, such as mirroring or smart backup, to system 20. One or more of such systems 900A-900N may be, include, or be included in one or more data storage systems, such as the Symmetrix Clariion family of data storage systems manufactured by EMC Corporation of Hopkinton, Mass., and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek.

In particular, provider 930 can provide application-based data storage services for specific applications such email applications and user network shares for servers 22 and/or devices 24.

Thus, if, for example, platform 26 performs regular (e.g., bi-hourly) backups of application data in system 20 to provider 930 (e.g., in place of tape backups), and then a virus is detected within system 20, or a user such as user 54 accidentally overwrites or otherwise erases important data in system 20, platform 26 can help resolve the situation by accessing a backup residing at provider 930. In such a case, platform 26 can provide such backup data back into system 20. Similarly, with respect to disaster recovery, if provider 930 is geographically remote or can forward platform 26 data to a geographically remote site, and platform 26 loses sectors or is lost completely, platform 26 data is safe, and can be restored, e.g., to a replacement instance of system 20 having a replacement instance of platform 26.

In at least some implementations, platform 26 can allow provider 930 to supply services to system 20 under a subscription fee arrangement, much as Internet connectivity is provided conventionally; for example, backup services can be charged on a per gigabyte per month basis, with a premium charged for faster access or transfer.

Link 910 may be, include, or be included in one or more different types of data links, including DSL, cable modem, or dedicated LAN. Since confidentiality of system 20 data may be important, platform 26 can encrypt all data sent outside of system 20 on link 910, so that the information represented by the data cannot be accessed by, for example, service provider 930 or its employees, even while service provider 930 is applying data protection and/or other features to such data.

Platform 26 and provider 930 can provide mirroring including asynchronous mirroring and/or (in at least some cases) synchronous mirroring.

In at least some implementations, it is important for platform 26 to include deduplication and/or compression features such that link 910 is used efficiently, especially during operations involving large data transfers, such as backups. For example, if system 20 has ten copies of a large email attachment (e.g., one for each of ten users to whom the email was sent), the deduplication feature can identify such copies to help avoid clogging link 910 unnecessarily when email data for system 20 is being backed up to provider 930.

In general, with respect to use of link 910, and optionally with respect to use of data storage space within system 20 generally and/or data storage space of platform 26 specifically, encryption, deduplication, and/or compression features may be used by platform 26 to manage application data effectively, without requiring software to be loaded onto servers 22 or devices 24. Such features are used in the context of applications so that, for example, data associated with an application such as an email application may be backed up and restored or mirrored using provider 930 without necessarily affecting data associated with other applications, or email related backups may be given priority over file share related backups. In another example, to the extent that servers 22 and devices 24 store user data on platform 26, encryption applied by platform 26 to such user data, even while such user data is at rest, allows encryption based data security to be supplied within system without requiring servers 22 and devices 24 to run encryption software.

FIG. 9 also shows that provider 930 may be used to allow data from system 20 to be cloned and/or otherwise transferred via another link 940 to another system 920, which may be, include, or be included in a system that represents another instance of system 20, at least with respect to having another instance 26(3) of platform 26. In a particular implementation, platforms 26, 26(3), and provider 930 operate so that such cloning and/or transfer can be accomplished without requiring a direct link between systems 20, 920, which direct link may be too impractical and/or too costly, especially where system 920 is geographically remote from system 20.

In at least some implementations, platform 26 may be provided and maintained by provider 930, as a type of office-level "set top box" from provider 930, such that features of platform 26 related to link 910 are controlled by provider 930, including upgrades to platform 26 software supporting such features.

Since in some installations link 910 may have narrow bandwidth relative to features offered by provider 930, platform 26 may also use a staging feature, e.g., in addition to encryption, deduplication, and/or compression, to help make efficient use of link 910. For example, if traffic over link 910 (e.g., for Internet use or email or file transfers) is heaviest during the day, backups may be staged to execute at night. Since platform 26 itself may supply data protection, e.g., via RAID, such staging or delaying of the backup of data can be done without excessive risk to system 20.

While various embodiments of the invention have been particularly shown and described, it will be understood by those skilled in the art that various changes in form and details may be made therein without departing from the spirit and scope of the invention as defined by the appended claims.

For example, the applications 40 described above included a SQL application and a web application by way of example only. Other types of applications are suitable for use as well such as other database server applications, other web applications, email server applications, file server applications, security server applications, network server applications, specialized applications, and so on.

What is claimed is:

1. A method for use in supplying data storage services, the method comprising:

discovering a set of applications running on an electronic system, wherein an application services system in communication with the electronic system discovers the set of applications for managing life cycle of each application of the set of applications, wherein managing life cycle of an application includes deploying the application, discovering the application, provisioning resources for the application, providing application services, and monitoring the application;

based on the discovery, querying a user to identify an application from the set of applications for managing the application;

based on the identification, providing an application service to the application identified by the user to support operation of that application, wherein the application service is provided by the application services system to the user, the application service being separate from operating system services and security protection services provided by the electronic system, wherein the application service includes provisioning service, backup service and migration service;

managing the application using a user interface provided by the application services system;

communicating with a data storage service provider being separate from the electronic system to use resources of the data storage service provider in providing the application service to the application identified by the user, wherein the data storage service provider having the control circuitry supplies mirroring and smart backup; and monitoring the application by monitoring operations of the application and collecting data associated with the application, wherein the application is monitored by the application services system.

2. The method of claim 1, wherein the application service comprises backup of data used by each application in the set, and the data storage service provider resources used comprise data storage equipment.

3. The method of claim 1, wherein the application service comprises replication of data used by each application in the set, and the data storage service provider resources used comprise data storage equipment.

4. The method of claim 1, wherein the application service comprises disaster recovery restoration of data used by each application in the set, and the data storage service provider resources used comprise data storage equipment.

5. The method of claim 1, wherein the application service comprises data deduplication of data used by each application in the set, and the data storage service provider resources used comprise data storage equipment.

6. The method of claim 1, wherein the application service comprises compression of data used by each application in the set, and the data storage service provider resources used comprise data storage equipment.

7. The method of claim 1, wherein the application service comprises cloning of data used by each application in the set, and the data storage service provider resources used comprise data storage equipment, the method further comprising:

by the application service, cloning the data to another electronic system, wherein the another electronic system is another instance of the electronic system.

8. The method of claim 1, further comprising:
providing the application service under a subscription fee arrangement.

9. The method of claim 1, further comprising:
providing the application service together with Internet connectivity.

10. The method of claim 1, further comprising:
encrypting communications with the data storage service provider.

11. The method of claim 1, further comprising:
staging operation of the application service to avoid high traffic times.

12. A method for use in supplying data storage services, the method comprising:

providing a entry point in an electronic system for providing external-based data storage services to the electronic system;

discovering a set of applications running on an electronic system, wherein an application services system in communication with the electronic system discovers the set of applications for managing life cycle of each application of the set of applications, wherein managing life cycle of an application includes deploying the application, discovering the application, provisioning resources for the application, providing application services, and monitoring the application;

based on the discovery, querying a user to identify an application from the set of applications for managing the application;

based on the identification, providing an application service to the application identified by the user to support operation of that application, wherein the application service is provided by the application services system to the user, the application service being separate from operating system services and security protection services provided by the electronic system, wherein the application service includes provisioning service, backup service and migration service;

managing the application using a user interface provided by the application services system;

communicating with a data storage service provider being separate from the electronic system to use resources of the data storage service provider in providing the application service to the application identified by the user, wherein the data storage service provider having the control circuitry supplies mirroring and smart backup; and monitoring the application by monitoring operations of the application and collecting data associated with the application, wherein the application is monitored by the application services system.

13. The method of claim 12, wherein the application service comprises backup of data used by each application in the set, and the data storage service provider resources used comprise data storage equipment.

14. The method of claim 12, wherein the application service comprises replication of data used by each application in the set, and the data storage service provider resources used comprise data storage equipment.

15. The method of claim 12, wherein the application service comprises disaster recovery restoration of data used by each application in the set, and the data storage service provider resources used comprise data storage equipment.

16. The method of claim 12, wherein the application service comprises data deduplication of data used by each application in the set, and the data storage service provider resources used comprise data storage equipment.

17. The method of claim 12, wherein the application service comprises compression of data used by each application in the set, and the data storage service provider resources used comprise data storage equipment.

18. The method of claim 12, wherein the application service comprises cloning of data used by each application in the set, and the data storage service provider resources used comprise data storage equipment, the method further comprising:

by the application service, cloning the data to another electronic system, wherein the another electronic system is another instance of the electronic system.

19. The method of claim 12, further comprising:
providing the application service under a subscription fee arrangement.

20. The method of claim 12, further comprising:
providing the application service together with Internet connectivity.

* * * * *